Patented Nov. 14, 1933

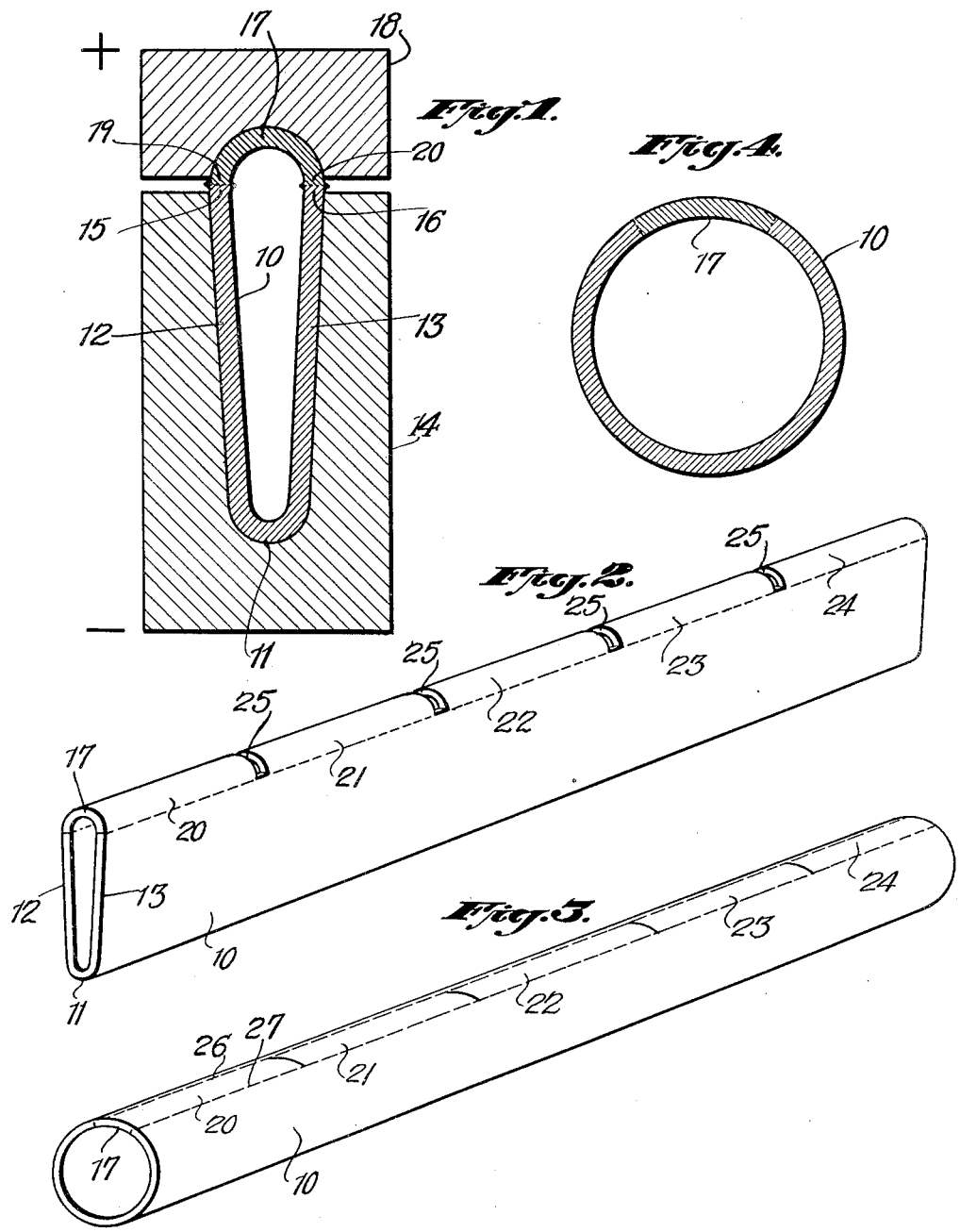

1,935,152

UNITED STATES PATENT OFFICE 1,935,152

PRODUCTION OF HOLLOW ARTICLES

Henry S. Holmes, New York, N. Y., assignor, by mesne assignments, to Metropolitan Engineering Company, Brooklyn, N. Y., a corporation of New York Application January 31, 1929. Serial No. 336,403

7 Claims. (Cl. 219—10)

This invention relates to a welded pipe or tube and to a method of welding and forming pipes, tubes or other elongated articles of circular or rounded cross section.

In the application of Thomas E. Murray Serial No. 633,407, issued as Patent No. 1,729,180, Sept. 24, 1929 there is described a method of forming elongated hollow articles in which a number of sections are successively welded by electric resistance welding to the side edges of a lengthwise extending part and the sections are then welded to each other by arc or flame welding.

An object of the present invention is to provide a pipe or tube construction of circular, or approximately circular, cross section, in which a number of sections are welded longitudinally to a lengthwise extending part and are joined to each other by transverse welds of short lengths; and to provide a method by which relatively narrow, longitudinally extending sections may be welded to a relatively wider, lengthwise section by electric resistance welding.

In welding two parts by electric resistance welding it is necessary to bring the parts together with considerable pressure which results in the shortening of the articles at the weld. In joining two hollow articles at their longitudinal edges it is necessary to support each piece in order to obtain the necessary pressure. In order to avoid the use of an internal electrode or supporting piece within the article to be welded it is necessary that the edges to be welded must be substantially in line with each other or slightly flared so that they may rest against, and be supported by, a supporting form on the outer walls. This would ordinarily require that semi-cylindrical pieces be used in making a cylindrical pipe and this would necessitate transverse welds between the pieces being joined of a length equal to one-half the circumference of the pipe or tube.

In the present invention this obstacle is overcome by forming the sections to a shape that will enable short, narrow pieces to be welded to a longer piece or length to form an elongated object which may then be rounded to a circular cross section.

With these and other objects in view the invention comprises the method of making articles described in the following specification and claims.

The various features of the invention are illustrated in the accompanying drawing, in which—

Fig. 1 is a cross section of the two sections in position to be welded with electric resistance welding on their longitudinal edges.

Fig. 2 is a perspective view of an article of the form as a result of the electric resistance welding operation.

Fig. 3 is a perspective view of the article when shaped to a rounded cross section, and Fig. 4 is a cross sectional view of the object shown in Fig. 3.

In the present invention a long, narrow, trough-like or channeled part 10 is first formed with a rounded bottom or bight part 11 and a pair of side walls 12 and 13 which extend in approximately parallel or preferably slightly diverging directions from the rounded bottom or bight portion 11. This section is then placed in an electrode 14 having a recess shaped to fit the shape of the section and to permit the side walls 12 and 13 to project slightly above the top of the electrode as at 15 and 16. By making the side walls 12 and 13 slightly divergent, any downward pressure on the edges of the walls 12 and 13 is resolved outwardly against the inner faces of the electrode 14, thus supporting the walls 12 and 13 against collapse. A relatively short, narrow, semi-circular section 17 is then placed in inverted position in an upper electrode 18, the side walls of which project downwardly at 19 and 20. The electrode is then brought downwardly in the position shown in Fig. 1 to bring the side edges of the section 17 into contact with the projecting edges of the lower section 10, and an electric current is passed from the upper electrode 18 through the walls of the upper section 17 and lower section 10 to the lower electrode 14. The projecting edge portions 15 and 16, 19 and 20 of the lower and upper sections are thereby brought to a welding temperature and the two sections are pressed together under heavy pressure. In a similar manner a number of sections 20, 21, 22, 23 and 24 are welded end to end to the desired length of the article, five of such sections being shown by way of example. The joint between adjacent sections 17 and 21 is then welded by an arc weld 25 and the joints between each of the successive sections are welded by arc welding. As a result, the structure shown in Fig. 2 is formed. This structure may be brought to the desired circular form by the method shown in the patent to Murray No. 1,534,144 issued April 21, 1925, and thus a circular pipe or tube of the shape shown in Figs. 3 and 4 will be formed and in which the section 10 will complete the greater part of the circumference of the tubular object, the remaining gap being joined by the relatively narrow sections 17—24.

In the completed article the longitudinal welds 26 and 27 between the long section 10 and the relatively short, narrow section 17 are electric resistance welds. At the same time, the transverse welds 25 are short, extending through only a very small arc of the circular cross section of the tube or pipe.

As changes of construction could be made within the scope of my invention, it is intended that all matter contained in the above description or shown in the accompanying drawing shall be interpreted as illustrative and not in a limiting sense.

What I claim is:

1. A method of forming a tubular article of the type described which comprises forming a channel shaped member having deep side walls, successively welding a series of shorter, shallower channel sections in end position to said channel shaped member and in inverted relation thereto on their longitudinal edges, welding the shorter channel sections to each other on transverse seams, and shaping the continuous closure thus formed to a cylindrical shape.

2. A method of forming tubular articles which comprises placing a number of shorter, semi-cylindrical sections successively in end to end position on a longer channel shaped member having deep side walls and in inverted position thereto with the side edges of said shorter sections abutting the side edges of said longer section, welding the sections on their longitudinal edges by electric resistance welding under pressure, welding the shorter sections to adjacent sections by transverse welds, and shaping the structure to a cylindrical shape.

3. A method of forming tubular articles which comprises forming a deep channel section having a semi-cylindrical bottom and side walls slightly diverging from a parallel position, placing a series of shorter, semi-cylindrical sections end to end in inverted relation to, and with their side edges abutting, said deep channel section, successively welding the said abutting side edges of successive sections to the side edges of said deep channel section with electric resistance welding, welding the seams between adjacent shorter sections, and shaping the structure to a circular cross section.

4. A method of forming tubular articles of the type described which comprises placing short, semi-cylindrical sections in inverted position end to end on a longer channel section having slightly diverging side walls, welding the abutting longitudinal edges of said channel and semi-cylindrical sections by electric resistance welding, welding the transverse joints between successive semi-cylindrical sections, and expanding the resistance welded structure.

5. A method of forming hollow articles of the type described which comprises placing a semi-cylindrical section in inverted position on a channel section having slightly diverging side walls, and welding the abutting longitudinal edges of said channel and semi-cylindrical sections by electric resistance welding.

6. A method of forming hollow articles of the type described which comprises supporting on its lower and side walls a channel section having slightly diverging side walls, placing a semi-cylindrical section in inverted position on the upper longitudinal edges of said channel section, and welding the abutting longitudinal edges of said channel and semi-cylindrical sections by electric resistance welding under heavy pressure.

7. A method of forming a tubular article of the type described which comprises forming a channel shaped member having deep side walls, successively welding a series of shorter, shallower channel sections in end position to said channel shaped member and in inverted relation thereto on their longitudinal edges, and completing the structure by shaping and by closing the shorter channel sections to each other on transverse seams.

HENRY S. HOLMES.